United States Patent
Sikkink et al.

(10) Patent No.: US 9,852,096 B2
(45) Date of Patent: Dec. 26, 2017

(54) HIGH SPEED SERIAL LINK IN-BAND LANE FAIL OVER FOR RAS AND POWER MANAGEMENT

(71) Applicant: Hewlett Packard Enterprise Development LP, Houston, TX (US)

(72) Inventors: Mark Ronald Sikkink, Chippewa Falls, WI (US); John Francis De Ryckere, Eau Claire, WI (US); Joseph Martin Placek, Chippewa Falls, WI (US); Karen Rae Beighley, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 142 days.

(21) Appl. No.: 14/224,795

(22) Filed: Mar. 25, 2014

(65) Prior Publication Data

US 2015/0278040 A1    Oct. 1, 2015

(51) Int. Cl.
*G06F 11/00* (2006.01)
*G06F 13/40* (2006.01)
*G06F 11/20* (2006.01)

(52) U.S. Cl.
CPC ...... *G06F 13/4022* (2013.01); *G06F 11/2007* (2013.01); *G06F 2201/81* (2013.01); *G06F 2201/85* (2013.01)

(58) Field of Classification Search
USPC .......................................................... 714/4.11
See application file for complete search history.

(56) References Cited

U.S. PATENT DOCUMENTS

| 6,732,186 | B1 | 5/2004 | Hebert | 709/239 |
| 6,798,500 | B2 | 9/2004 | Wilson et al. | 356/73.1 |
| 6,839,856 | B1* | 1/2005 | Fromm | G06F 13/124 |
| | | | | 365/220 |
| 6,961,347 | B1 | 11/2005 | Bunton et al. | 370/465 |
| 7,451,362 | B2 | 11/2008 | Chen et al. | 714/704 |
| 7,756,123 | B1 | 7/2010 | Huang et al. | 370/359 |
| 8,027,358 | B2 | 9/2011 | Safranek et al. | 370/463 |

(Continued)

FOREIGN PATENT DOCUMENTS

EP    2672642 A2    12/2013    .............. H04L 1/00

OTHER PUBLICATIONS

Tektronix, "Anatomy of an Eye Diagram", www.textronix.com/bertscope, 12 pages, dated Sep. 2010.

(Continued)

*Primary Examiner* — Sarai Butler

(57) ABSTRACT

A system and method provide a communications link having a plurality of lanes, and an in-band, real-time physical layer protocol that keeps all lanes on-line, while failing lanes are removed, for continuous service during fail over operations. Lane status is monitored real-time at the physical layer receiver, where link error rate, per lane error performance, and other channel metrics are known. If a lane failure is established, a single round trip request/acknowledge protocol exchange with the remote port completes the fail over. If a failing lane meets an acceptable performance level, it remains on-line during the round trip exchange, resulting in uninterrupted link service. Lanes may be brought in or out of service to meet reliability, availability, and power consumption goals.

22 Claims, 16 Drawing Sheets

(56) References Cited

U.S. PATENT DOCUMENTS

| | | | |
|---|---|---|---|
| 2002/0184410 A1* | 12/2002 | Apel | G06F 9/4411 710/5 |
| 2003/0101369 A1* | 5/2003 | Kahler | G06F 11/0727 714/5.11 |
| 2005/0174471 A1* | 8/2005 | DeMoor | H04N 1/2112 348/362 |
| 2007/0168584 A1* | 7/2007 | Kamimura | G11C 7/10 710/62 |
| 2010/0083066 A1 | 4/2010 | Sivaramakrishnan et al. | 714/748 |
| 2011/0228861 A1* | 9/2011 | Nagano | G06F 11/0745 375/259 |
| 2012/0213060 A1 | 8/2012 | Poulson et al. | 370/225 |
| 2012/0260121 A1* | 10/2012 | Yadav | H04L 45/28 714/2 |

OTHER PUBLICATIONS

Intel, Intel 7500/7510/7512 Scalable Memory Buffer Datasheet, 40 pages, dated Apr. 2011.
Kanter, "Intel's Quick Path Evolved", http://www.realworldtech.com, 3 pages, dated Jul. 20, 2011.
Behera et al., "Eye Diagram Basics: Reading and applying eye diagrams", EDN, 6 pages, dated Dec. 16, 2011.
International Searching Authority, International Search Report—International Application No. PCT/US2015/022181, dated Jul. 16, 2015, together with the Written Opinion of the International Searching Authority, 11 pages.

\* cited by examiner

HIGH SPEED SERIAL LINK IN-BAND LANE FAIL OVER FOR RAS AND POWER MANAGEMENT

TECHNICAL FIELD

The present invention relates to multiplex communications in a computer system, and more particularly to performing a partial fail over to use a portion of a communications link while continuing communications on the link without interruption.

BACKGROUND ART

High performance computing (HPC) systems include large, distributed systems having many computing nodes that communicate with each other to solve a shared computation. The connections between nodes are often formed from high speed serial interconnects that transmit bits of data (i.e., ones and zeros) in parallel data lanes at a maximum speed, or bit rate. The long term reliability of high speed serial interconnects is being challenged as transmission rates increase. In particular, as bit rates increase, there is a corresponding increase in signal loss caused by the underlying physical media. This signal loss is managed by increasing circuit complexity, using higher cost materials, and actively repeating the signal (or reducing the physical distance between nodes). All of these mitigation tools attempt to achieve high Mean Time To False Packet Acceptance (MTTFPA), with maximum service time or availability.

Lane fail over is a serial link feature that removes a failing lane(s) from service if its error rate is at or approaching a level that results in unacceptable performance or MTTFPA. During many prior art fail over procedures, all lanes are removed from service, while the communications link re-initializes to a reduced width avoiding failing lane(s). During this interval, all network traffic directed towards the fail over communications link is re-routed (if alternate paths exist) or buffered. Both re-routing and buffering contribute to network congestion, reduced performance, and possibly even system failure.

SUMMARY OF THE EMBODIMENTS

Therefore, to address the above disadvantages, we provide an in-band or real-time physical layer protocol that keeps all lanes on-line while failing lane(s) are removed, for continuous service during fail over operations. Lane status is monitored real-time at the physical layer receiver, where link error rate, per lane error performance, and other channel metrics are known. If a lane failure is established, a single round trip request/acknowledge protocol exchange with the remote port completes the fail over. If the failing lane meets an acceptable performance level, it remains on-line during the round trip exchange, resulting in uninterrupted link service. If the failing lane is at an unacceptable performance level, the link pauses during the round trip exchange to eliminate opportunity for false packet acceptance. The protocol exchange supports fail over operations in both directions, simultaneously.

If the failing lane heals or is repaired off-line, it is returned to service using the in-band protocol, with continuous service during the operation. In fact, the protocol supports all transitions between fail over states, as conditions change. For example, a four lane link initially fails over to two lanes. Later another lane degrades, and the link fails over to one lane. All done in-band with minimal or zero down time, depending on fail severity as discussed previously.

The protocol is also used to perform in-band transition between physical layer power states. Uninterrupted transition to a low power state involves forcing in-band communications fail over to fewer lanes, then disabling the off-line lane(s). A seamless transition back to the normal power state involves enabling the off-line lane(s) and providing PLL lock, equalization, framing, and alignment with the on-line lane(s), then forcing in-band communications fail over to full width. All off-line operations are done out-of-band, without interrupting data flow at any time. Lane alignment markers are transmitted periodically on all lanes (on-line and off-line) to facilitate alignment.

In a first embodiment of the invention there is provided a high performance computing system comprising a plurality of computing devices that cooperate to perform a shared computation. Each computing device comprises one or more computing processors for performing a portion of the shared computation, and a control circuit, coupled to the one or more computing processors. The control circuit has a communications link and a micro-controller. The communications link is used for communicating data pertaining to the shared computation with a connected control circuit, the communications link having a plurality of data lanes, each data lane having a transmitter for transmitting data to the connected control circuit and a receiver for receiving data from the connected control circuit. The micro-controller is used for controlling the collective operation of the plurality of data lanes. The micro-controller is configured to calculate an error metric associated with the receipt of data by a receiver in a given data lane. The micro-controller is also configured, in response to the error metric failing a threshold test, to remove the given data lane from service while the communications link continues without interruption to communicate data with the connected control circuit using at least one other data lane in the plurality of data lanes.

Various modifications of the basic system are contemplated. The communications link may have four data lanes. The error metric may be a signal quality, a link bit error rate, or the score of an eye diagram. The micro-controller may be configured to transmit a fail over request to the connected control circuit, in which case it may be further configured to start a timeout process and to either (a) retry the fail over request or (b) cease transmitting data using the given data lane, when the timeout process completes prior to the micro-controller receiving, from the connected control circuit, an acknowledgement of the fail over request. Alternately or in addition, the micro-controller may be configured to transmit and receive data according to a fail over mode that is selected from a plurality of fail over modes based on which data lanes are in service, each such failure mode being associated with a data format, and further wherein the micro-controller configures the communications link to communicate data with the connected control circuit using the data format associated with the operating fail over mode. The system may also have a lane reversal multiplexer, and the lane reversal multiplexer may be configured by the micro-controller as a function of a hardware interconnect configuration. The microcontroller may be further configured to power down the given lane in response to the error metric failing the threshold test. Methods for performing these functions are also disclosed.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

System Architecture

Figure 1:
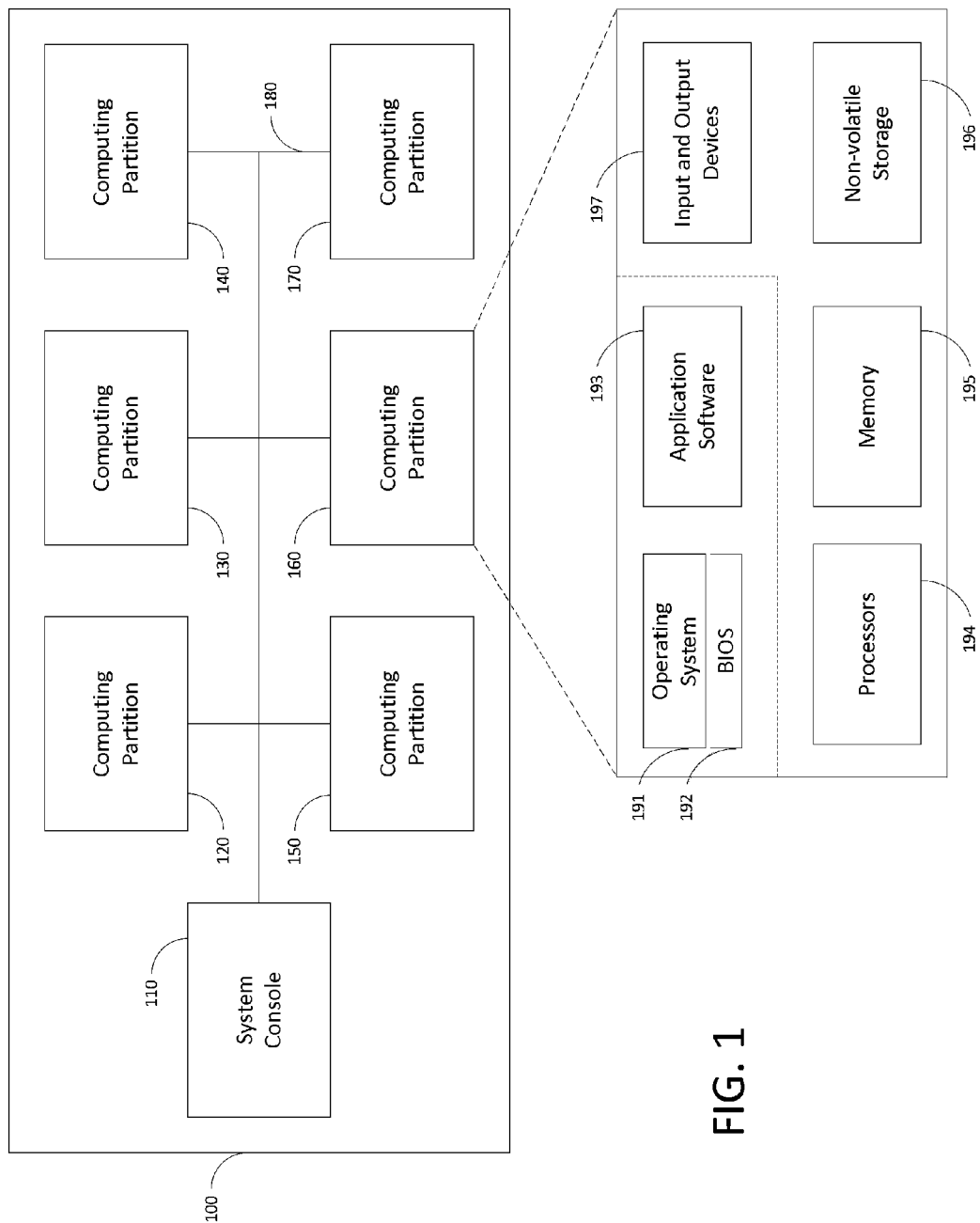
FIG. 1 schematically shows a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network cards, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
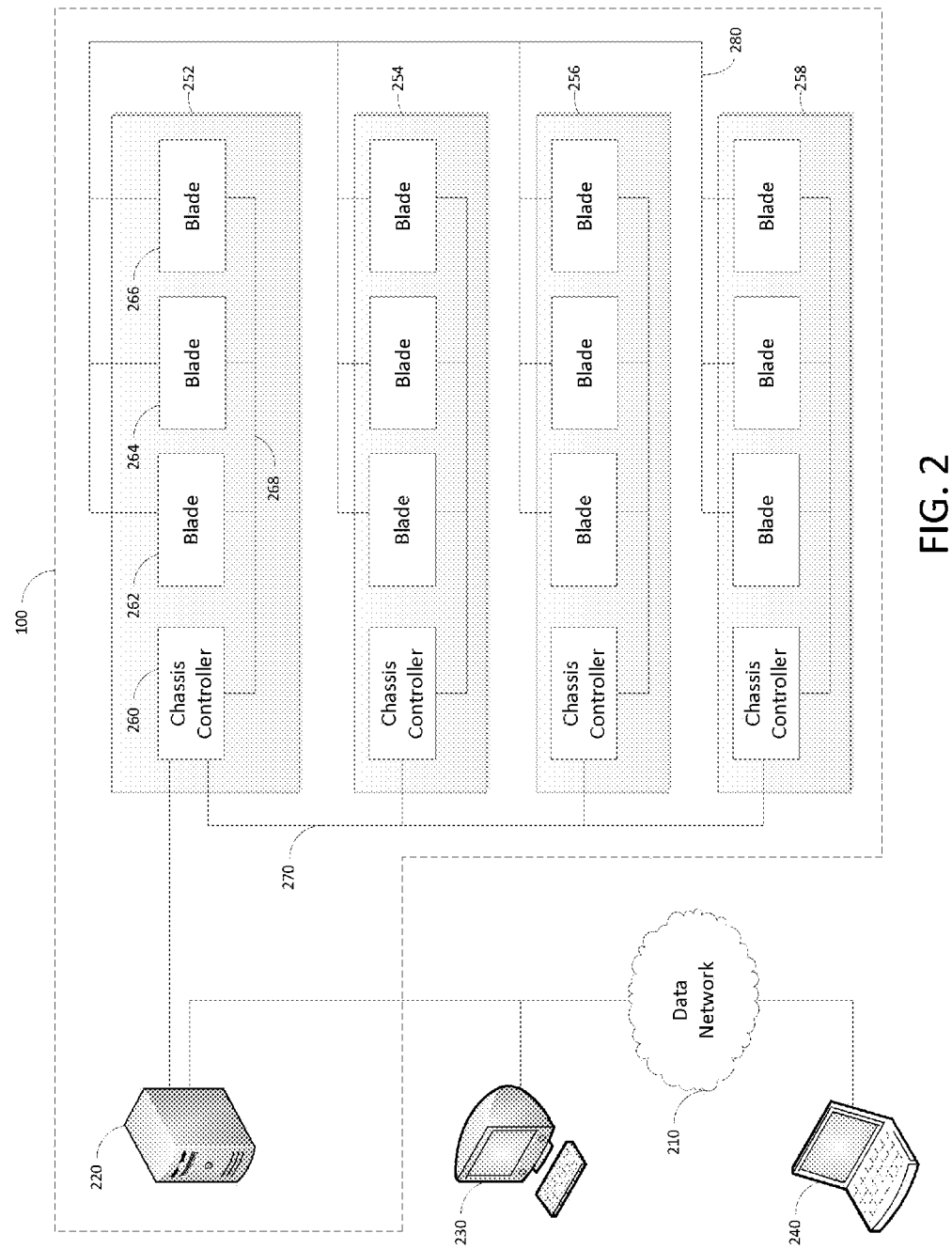
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to an enterprise data network 210 to facilitate user access.

The HPC system 100 includes a system management node ("SMN") 220 that performs the functions of the system console 110. The management node 220 may be implemented as a desktop computer, a server computer, or other similar computing device, provided either by the enterprise or the HPC system designer, and includes software necessary to control the HPC system 100 (i.e., the system console software).

The HPC system 100 is accessible using the data network 210, which may include any data network known in the art, such as an enterprise local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by an enterprise computer 230 by way of remote login using tools known in the art such as Windows® Remote Desktop Services or the Unix secure shell. If the enterprise is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NUMALINK, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or an enterprise computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, the computing hardware of its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
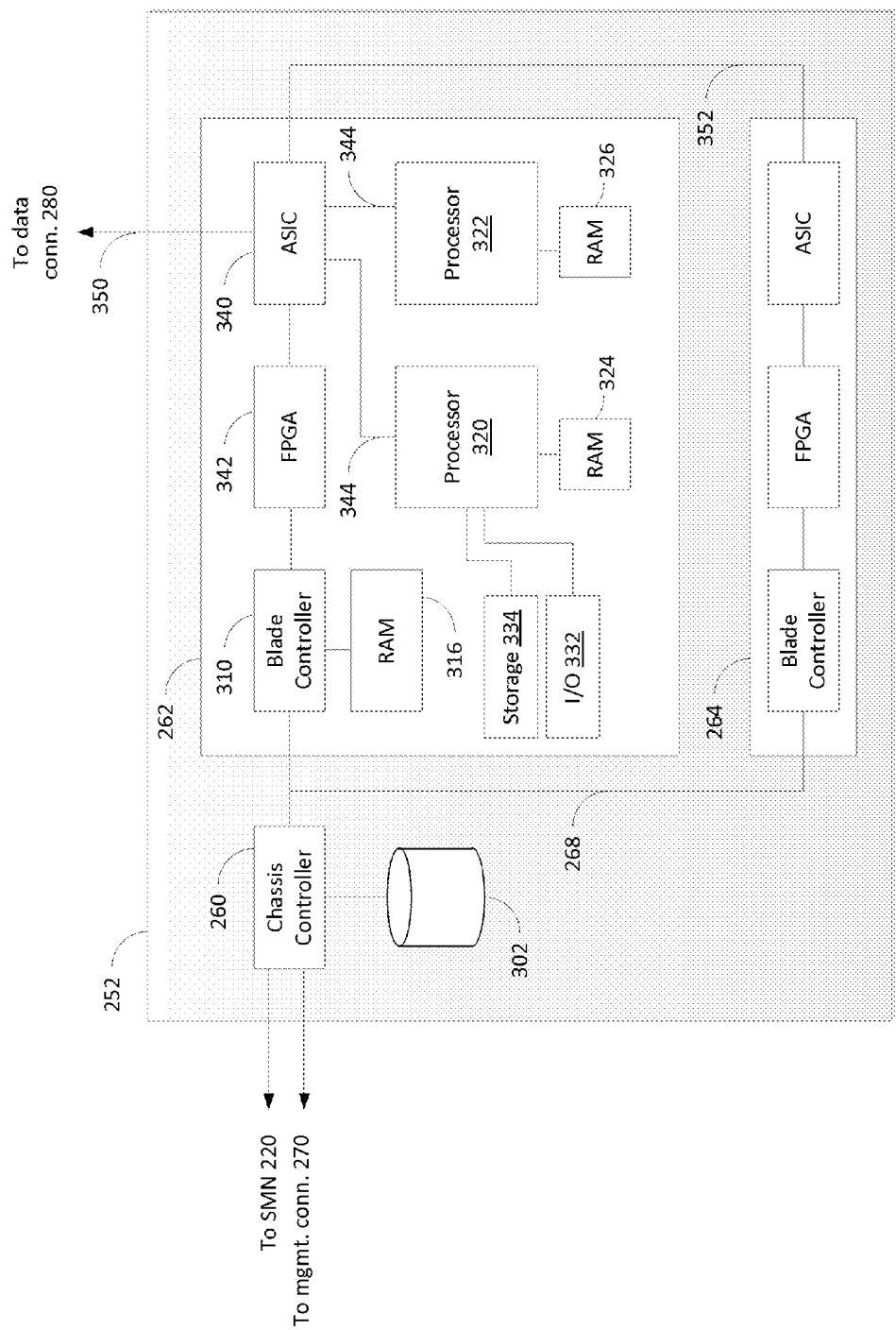
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to some devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a communications link 350 to the computing connection 280 that connects different blade chassis. This communications link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NUMALINK protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, an enterprise may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A processor 320 or 322 inside a blade may be referred to as a "computing node" or simply a "node" to emphasize its allocation to a particular partition. It will be understood that a physical blade may comprise more than one computing node if it has multiple processors 320, 322 and memory 324, 326.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Inter-ASIC Communications

Figure 4:
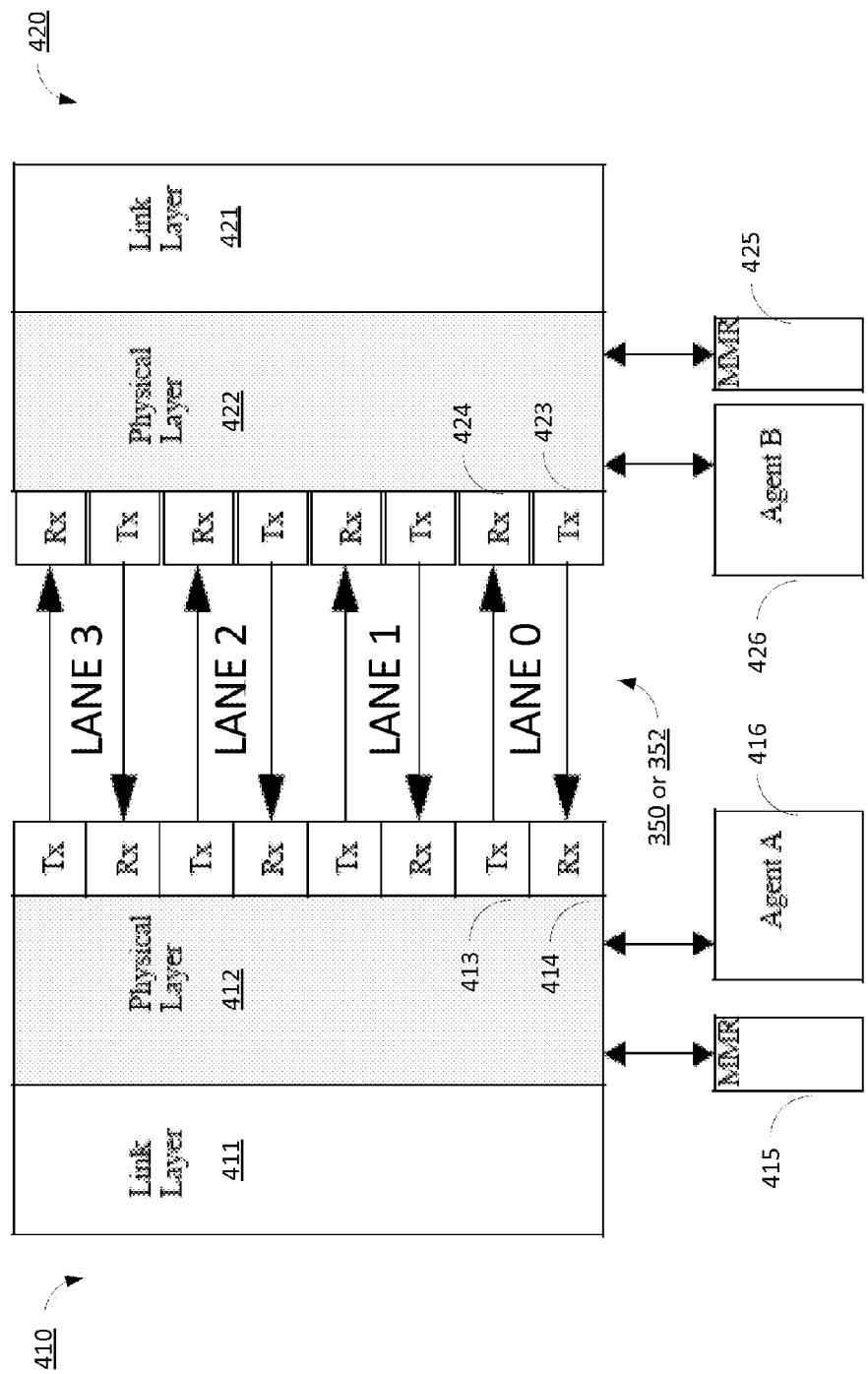
FIG. 4 schematically shows further details of the inter-ASIC connections 350, 352.

FIG. 4 schematically shows further details of the inter-ASIC communications links 350, 352. ASICs 410, 420 are connected by a multilane inter-ASIC communications link 350 or 352 (four lanes are depicted). Each ASIC 410, 420 is shown as having a link layer (411, 421 respectively) and a physical layer (412, 422 respectively). Other relevant portions of the ASICs 410, 420 are omitted for clarity. The physical layers 412, 422 provide each respective node access to the physical media (e.g., cabling or backplane circuitry) connecting the nodes. The link layers 411, 421 define fixed hardware addresses for the nodes, and provide one or more networking protocols (e.g. Ethernet or NUMALINK) that establish a logical link for passing data between the ASICs 410, 420 using those hardware addresses.

The communications link 350, 352 is depicted as having four bidirectional communication lanes, lane 0 through lane 3. It should be understood that the invention is not limited to the use of four lanes. The number of lanes used in any embodiment is a function of a number of factors, including: minimum bandwidth requirements, maximum latency requirements, link error rates, data retransmission overhead, commercial availability of physical connectors having a given number of lanes, and similar factors. Each such lane provides bidirectional communication between ASIC 410 and ASIC 420 using transmitters and receivers. For example, bidirectional communication using lane 0 is enabled by two unidirectional channels: one that sends from ASIC 410 to ASIC 420 using transmitter 413 and receiver 424 respectively, and one that sends data from ASIC 420 to ASIC 410 using transmitter 423 and receiver 414 respectively. The other lanes are similarly constructed.

Agent A 416 and Agent B 426 are hardware and firmware services, resident on their respective node controller ASICs 410, 420, for managing communications link 350, 352 in real-time. Each Agent 416, 426 uses an embedded micro-controller to achieve the required real-time performance. The micro-controller may be, for example, a smaller ASIC or a field-programmable gate array (FPGA). Memory mapped registers (MMRs) 415, 425 provide a gateway for software management that is used when real time performance is not required.

Operation of the communications link 350, 352 is now described with reference to NUMALINK as mentioned above. A message for communication from ASIC 410 to ASIC 420 is first formed. In this context, a "message" is a unit of data transfer between higher-level functions. A message may include, for example, computational data received from a processor in the node associated with the ASIC 410, system maintenance data generated by circuitry in another part of the ASIC 410, data from another node for which ASIC 410 is acting as a routing intermediary, or other such data having a meaning to a higher level protocol. In NUMALINK, a message includes a 128-bit header, marked by a head bit, zero or more additional packets, and ends with a packet marked with a tail bit.

The 128-bit NUMALINK message is received in the link layer 411, which places each packet into a "flit". In this context, a "flit" is the unit of transmission in the link layer protocol, which provides data flow control (thus, a flit is a "flow control unit"). In NUMALINK, each flit consists of the 128-bit packet together with an 8-bit control and a 16-bit cyclic redundancy check (CRC). The 152-bit flit is passed to the physical layer 412, which divides it into four "phits" as described below, and these phits are transmitted on the physical communications link 350, 352.

Transmission of data occurs using a clock signal that is synchronized between the two ASICs 410, 420. Each clock cycle, transmitters in the physical layer 412 of ASIC 410 each transmit a phit of data, using its associated lane in the communications link 350, 352, to a corresponding receiver in the physical layer 422 of the ASIC 420. The matched receiver receives this data using the synchronized clock.

Once the phits have been received, the physical layer 422 passes them to the link layer 421, which reassembles them into a flit. At this stage, the CRC is checked, and if there is a link error, an error flit is returned to the ASIC 410. If there is no error, the flit is returned to the higher layer protocols of ASIC 420 for processing.

In-Band Fail Over

The hardware/firmware Agents 416, 426 continually monitor link error rate and loss-of-signal at each physical layer receiver, generate and score an eye diagram at each receiver, and monitor other lane based error indicators. Thus, Agent A 416 monitors the receivers in the physical layer 412 of ASIC 410, including receiver 414, and calculates an error metric for each receiver. When the error rate or other metric fails its threshold test for a given receiver, the respective Agent 416, 426 determines which lane(s) is failing, and removes it from service using the in-band fail over protocol described herein. All lane fail over operations are initiated from the receive end of the link.

In accordance with various embodiment of the invention, fail over operations advantageously do not require shutting down the link. Thus, they may be used for a variety of reasons. In particular, fail over may be used when the error rate on a lane is high. Fail over also may be used to save power when doing so is desirable. Fail over also may be used to improve the reliability and availability of the link. Also advantageously, when a fail over condition is encountered, the transmitters and receivers that are not being associated with lanes in use may be powered down.

Each Agent 416, 426 utilizes at least three programmable registers. A 'current local' register is used to indicate a particular fail over configuration currently in use by the local transmitters. A 'pending local' register holds a pending, requested, or in-process fail over state. After fail over completes, the 'current local' and 'pending local' registers are equal. A 'remote' register is used for assigning to this ASIC fail over configurations received from the other ASIC. Each register stores a value that encodes which lanes should be used for transmitting data to, and receiving data from, the other side.

A preferred embodiment includes seven unique lane fail over configurations. These are: (1) the default four lanes, used when no fail over is required; (2) the upper pair of lanes, lane 2 and lane 3; (3) the lower pair of lanes, lane 0 and lane 1; and (4-7) any one of the four lanes individually. Any combination in both directions is supported, and fail over actions can occur simultaneously in both directions. The preferred embodiment therefore includes registers that have three bits to indicate a number between 1 and 7.

An alternate embodiment may use registers that have four bits, where each bit is set (equal to 1) if the lane should be used, and cleared (equal to 0) if the lane should not be used. Using the above register encoding, the most flexible embodiment uses registers having N bits, where N is equal to the number of lanes, although this is also the most complex embodiment to implement. Other embodiments may use other numbers and types of registers.

Figure 5A:
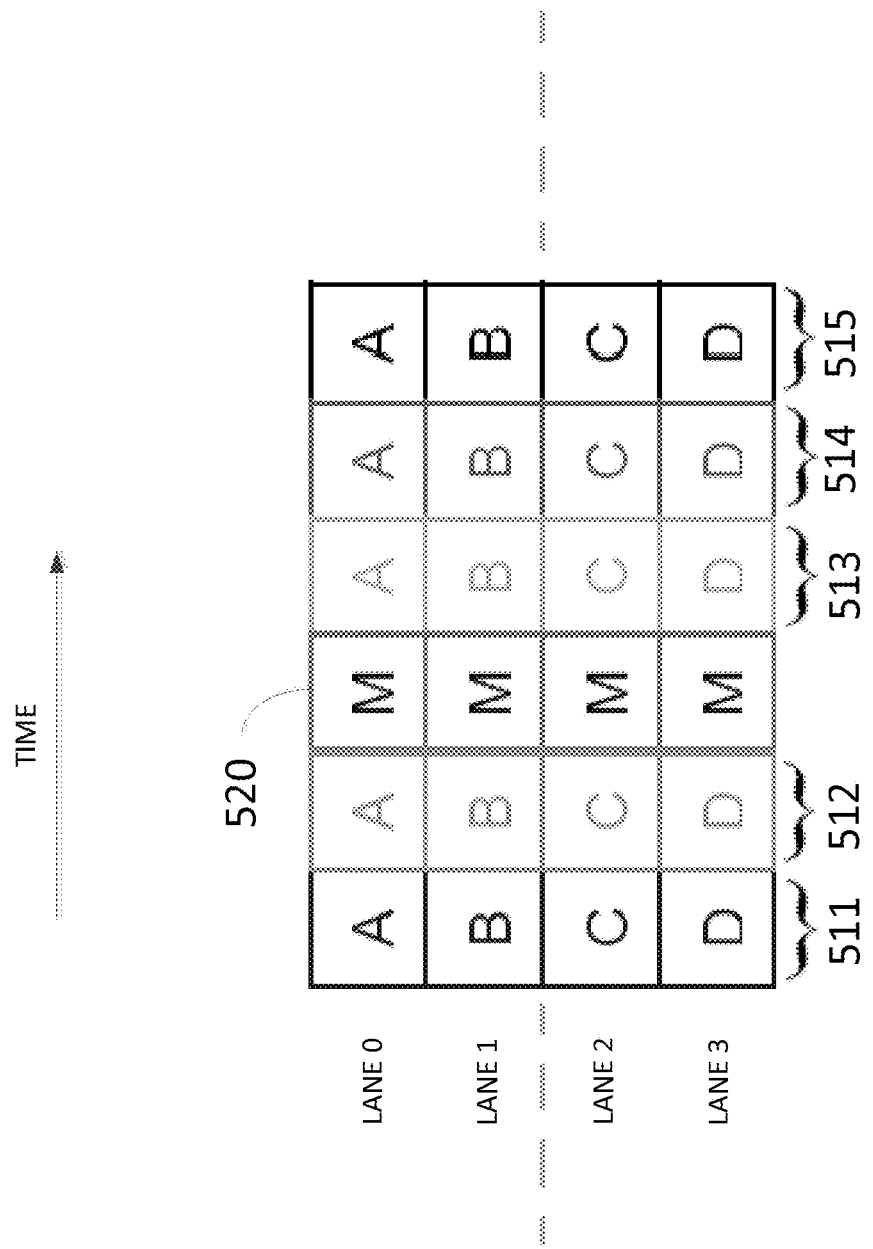
FIG. 5A schematically shows frames of data being transmitted using a four lane mode.
Figure 5B:
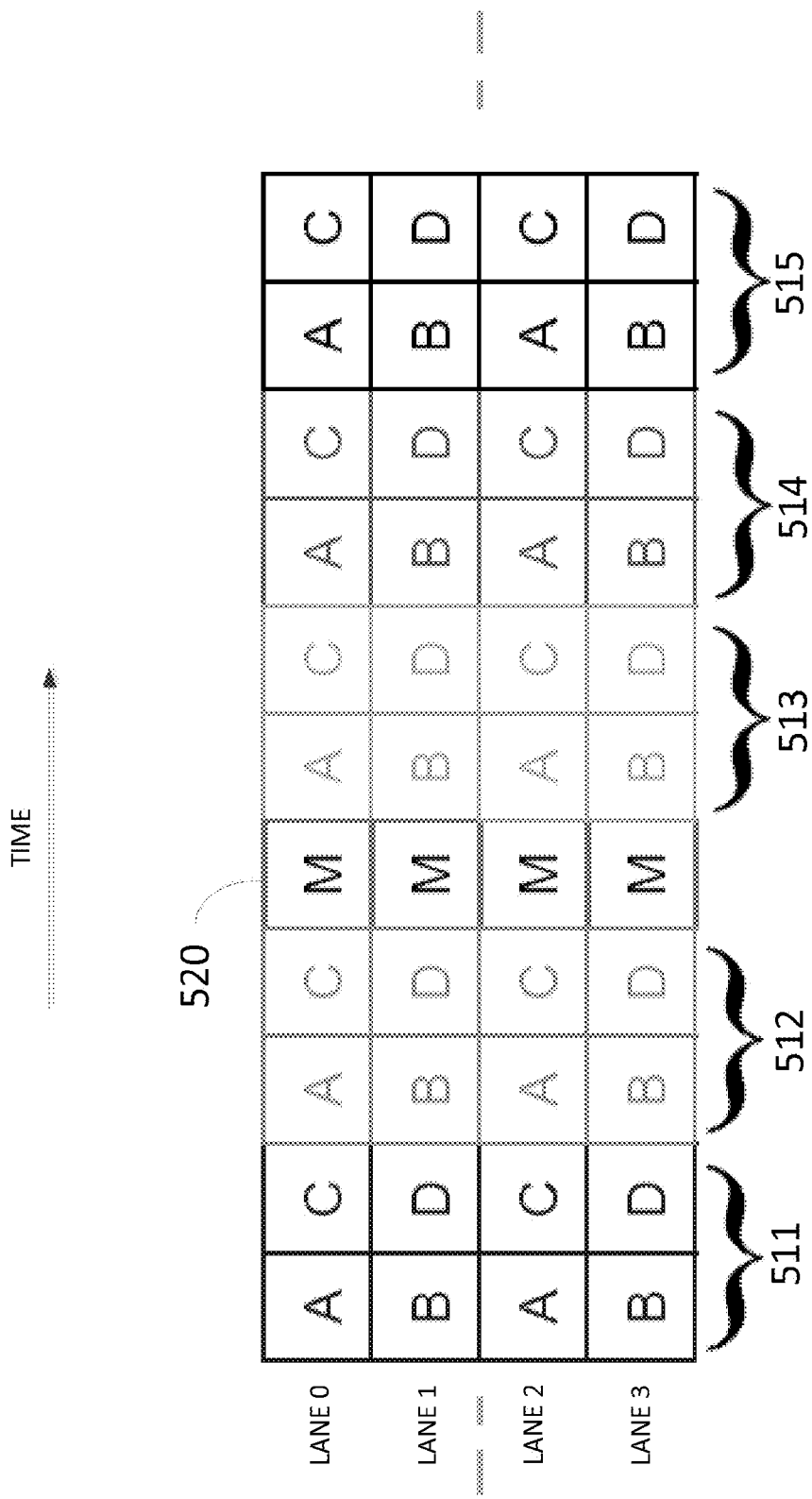
FIG. 5B schematically shows frames of data being transmitted using a two lane mode after a fail over.
Figure 5C:
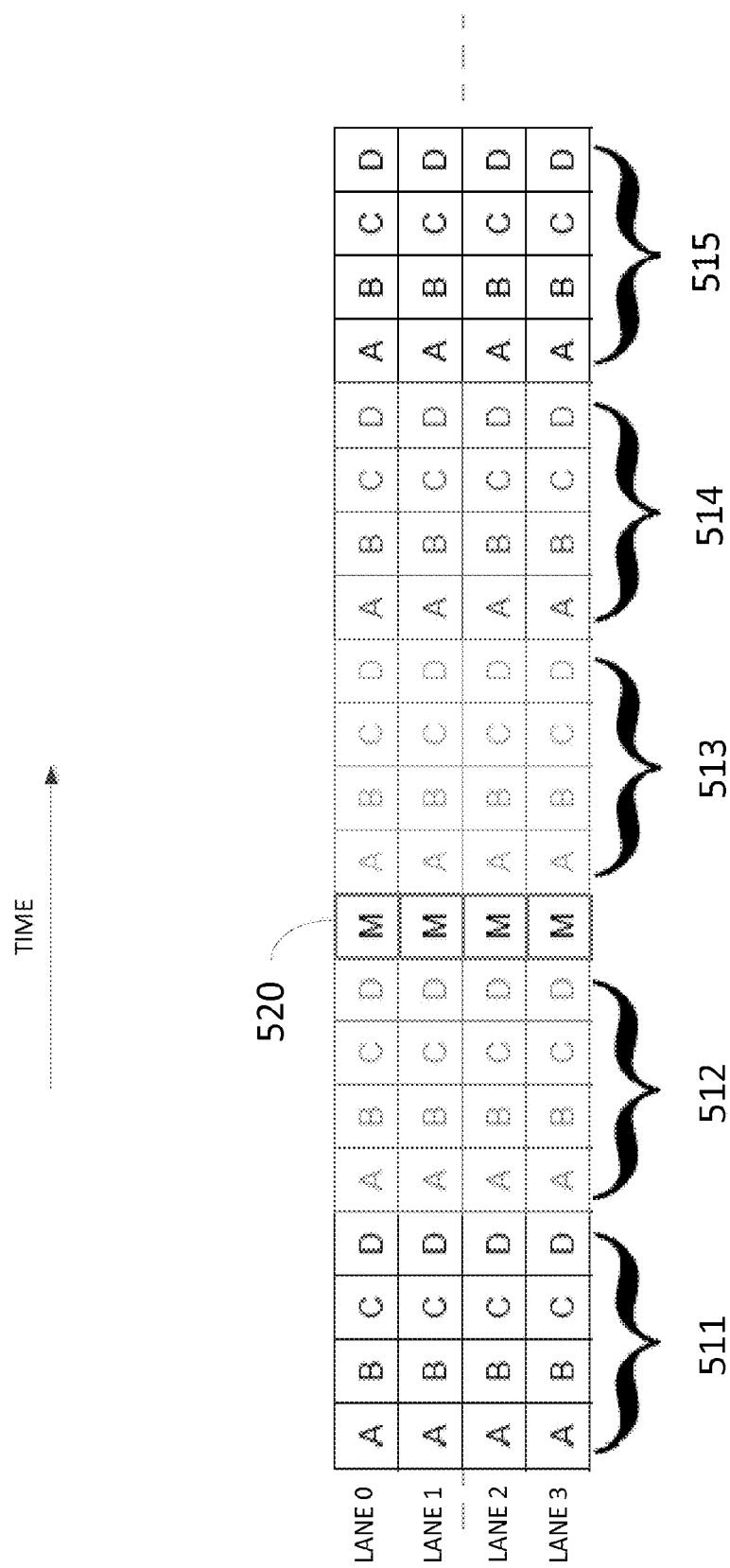
FIG. 5C schematically shows frames of data being transmitted using a one lane mode after a second fail over.

FIGS. 5A-5C show how transmitted data frames, or flits, are formatted across four physical lanes for each fail over mode in the preferred embodiment. The horizontal dimension is time, and the vertical dimension is lane number. Each data frame 511-515 is composed of four physical layer transfer units ("phits") labeled A,B,C,D. Each figure shows five data frames and one physical layer message.

Embodiments of the invention may use a handshake protocol to ensure that both the transmitter and the receiver are using the same fail over configuration. Each request or acknowledgment is an encoded physical layer message sent simultaneously on all four lanes; each lane carries an identical message M 520. Each request or acknowledgment can be sent once, or as multiple consecutive copies. This allows spatial and temporal polling techniques, improving reliability.

In the four lane mode shown in FIG. 5A, the transfer units A,B,C,D of each frame 511-515 are transmitted across the four lanes in one time period (e.g., a number of clock cycles). Because all four lanes are available for transmission, the four phits A,B,C,D of each frame are each transmitted on a separate lane. This configuration uses the maximum available bandwidth.

In the half-bandwidth mode shown in FIG. 5B, only two lanes are available for transmission. This pair of lanes is either lane 0 and lane 1, or lane 2 and lane 3. Therefore, the phits A,B,C,D are transmitted on both pairs of lanes. As can be seen, phit A of the first frame 511 is transmitted on lane 0 and lane 2, and phit B of frame 511 is simultaneously transmitted on lane 1 and lane 3. In this way, both phits are received by the receiving ASIC regardless which pair of lanes is active. Next, phit C of frame 511 is transmitted on lane 0 and lane 2, while phit D is simultaneously transmitted on lane 1 and lane 3. After phits C,D are received, the receiving ASIC assembles all phits together to reconstruct frame 511. This process is continued for the remaining frames 512-515. This configuration uses about half of the maximum available bandwidth, since it takes two time periods to send each frame but only one handshake message M 520 is transmitted.

In the quarter bandwidth mode shown in FIG. 5C, frames 511-515 are transmitted redundantly across all four lanes over four time periods. Thus, no matter which lane is active, phit A will be received after the first time period, phit B after the second, phit C after the third, and phit D after the fourth. This is true for each frame 511-515. This configuration uses about one quarter of the maximum available bandwidth. In these examples, the physical layer message M 520 spans a single time period. For improved reliability it may span multiple time periods. It is always inserted between data frames.

Figure 6:
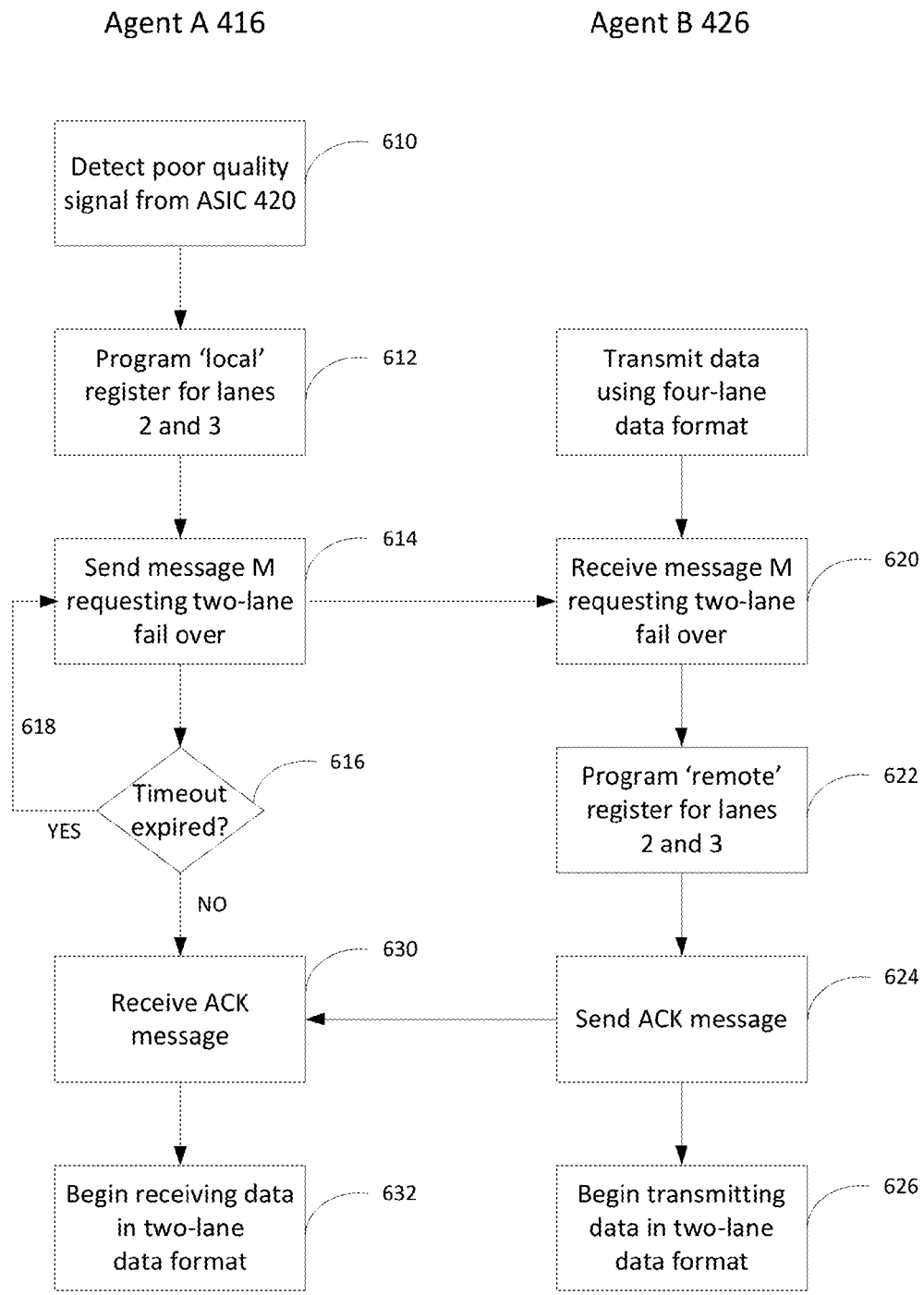
FIG. 6 is a flowchart showing processes used in performing a fail over operation.

FIG. 6 is a flowchart showing processes used in performing an exemplary fail over operation. In this example, the communications link 350, 352 fails over from four lanes to two lanes (lane 2 and lane 3) due to an error detected by ASIC 410.

In process 610, Agent A 416 detects poor signal quality in lane 1, and determines that the link should fail over to two lanes. In process 612, Agent A 416 programs its 'local' register to the upper lane pair {2,3} that does not include the lane having poor quality. In process 614, at the next frame boundary, Agent A 416 inserts a two lane fail over request M 520 into the data stream. Agent A 416 continues processing data it receives in four lane mode until an acknowledgement (ACK) is received from Agent B 426. Agent A 416 may pause data processing if the detected lane error severity is high. In process 616, Agent A 416 starts a timeout counter and waits for Agent B 426 to acknowledge the request. If the timer expires prior to receiving the ACK, Agent A 416 can preferably retry the request (as indicated by arrow 618), or declare the link down using a separate handshake message (not shown).

In process 620, Agent B 426 receives the two lane fail over request and processes it. It determines that the message M 520 is a request to fail over to the upper lane pair {2,3}. Therefore in process 622, Agent B 426 programs its 'remote' register to the upper lane pair {2,3}. At the next frame boundary, in process 624 Agent B inserts an acknowledge message into the serial data stream. All data immediately after the ACK is sent in two lane mode, as shown in process 626.

Meanwhile, in process 630, Agent A 416 receives the ACK and disables the timeout counter. Agent A 416 reconfigures from four lane to two lane mode, during the ACK pause cycle(s). Immediately following the acknowledge data, processing continues with the ASIC 410 configured to receive data in two lane mode {2,3} in process 632. As indicated in step 616, if Agent A's timer expires, the request can be retried. The retry may be different from the original request if the physical layer lane status changes.

Figure 7:
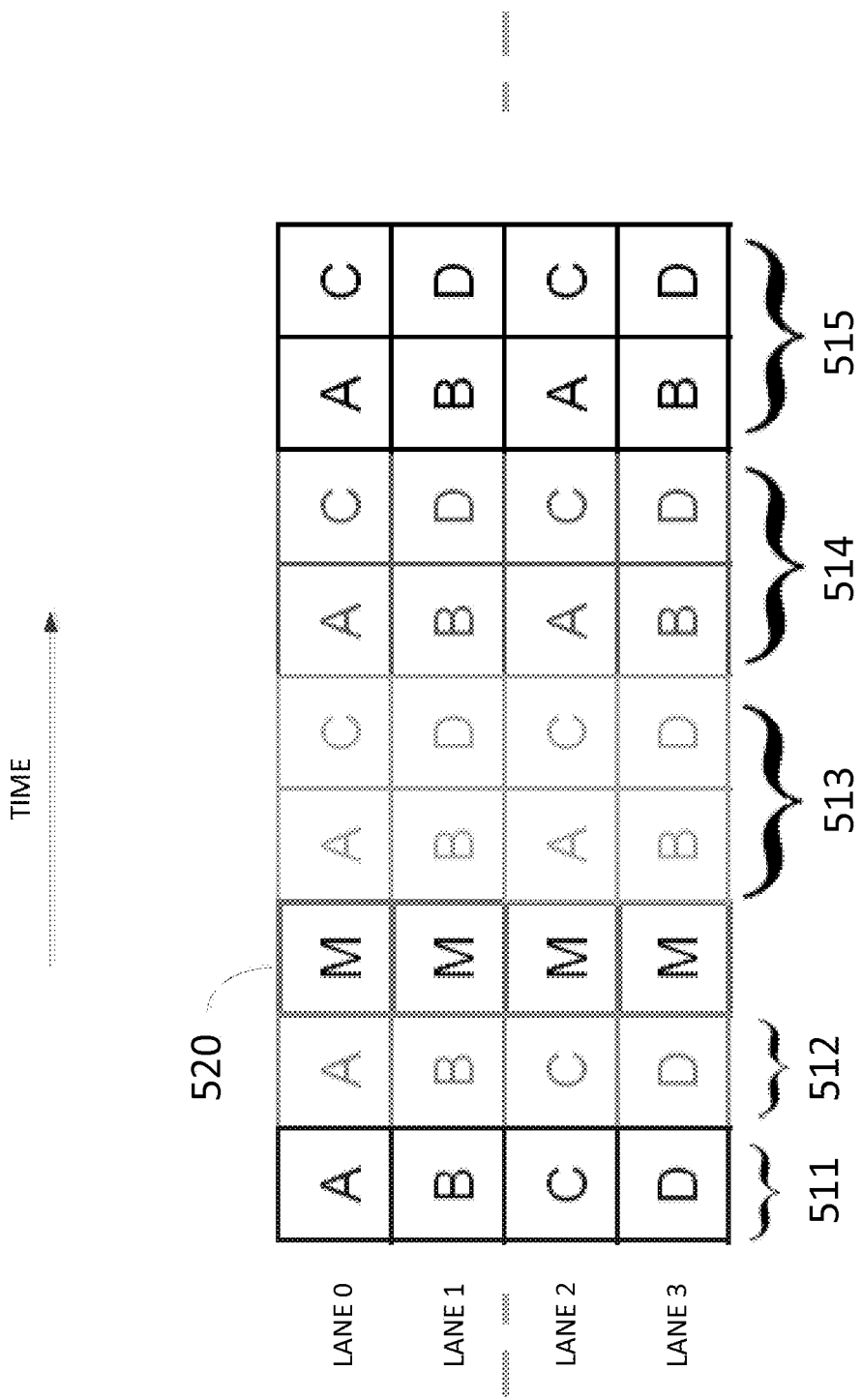
FIG. 7 schematically shows frames of data being transmitted using a transition between a four lane mode and a two lane mode.

FIG. 7 schematically shows frames of data being transmitted from ASIC 420 during a transition between a four lane mode and a two lane mode, as described in connection with FIG. 6. In process 610 Agent A 416 of ASIC 410 (not shown) detects a poor quality signal received from the transmitting ASIC 420 on lane 1. Agent A 416 then programs its 'local' register in process 612, and sends a two-lane failover message in process 614. With respect to FIG. 7, prior to receiving this message, ASIC 420 has transmitted frames 511, 512 to ASIC 410. However, upon receipt of this message in process 620, ASIC 420 programs its 'remote' register in process 622 to indicate that only lanes 2 and 3 are still acceptable to the remote ASIC 410. In process 624, at the next frame boundary after transmitting frame 512 in four-lane mode, ASIC 420 sends ACK message M 520 on all four lanes. Then, in process 626, ASIC 420 continues to transmit, without interruption, the remainder of the frames 513-515 to ASIC 410 according to the two-lane fail over data format (at half the bandwidth). Thus, ACK message M 520 marks the transition point between four lane and two lane modes.

Fail Over and Lane Reversal

Figure 8:
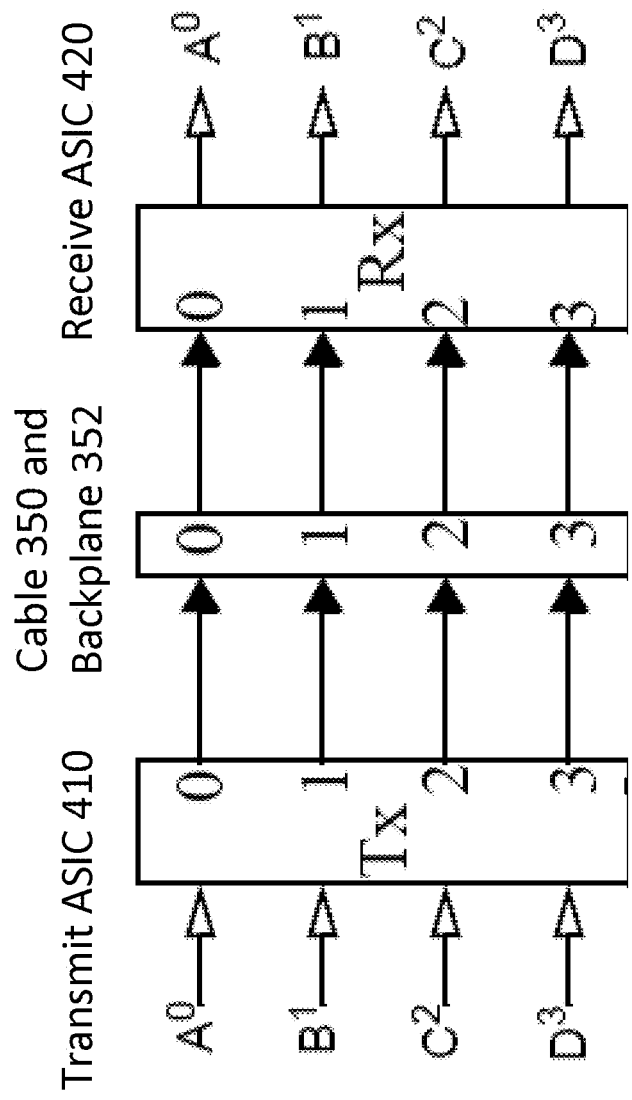
FIG. 8 depicts normal operation in one direction of several lanes of a communications link.

FIG. 8 depicts normal operation in one direction of several lanes of a communications link 350, 352. It shows a single data frame, or flit, made of four phits {A,B,C,D} that are transmitted across four logical lanes numbered 0,1,2,3. Thus, for example, the transmitting ASIC sends phit A on logical lane 0, phit B on logical lane 1, phit C on logical lane 2, and phit D on logical lane 3. FIG. 8 also shows the logical to physical lane mappings for both transmitting ASIC 410 and receiving ASIC 420. In this figure, the physical lane numbers align with the logical lane numbers; that is, data sent on logical lane 0 are transmitted on physical lane 0 in the communications link 350 or 352.

Figure 9A:
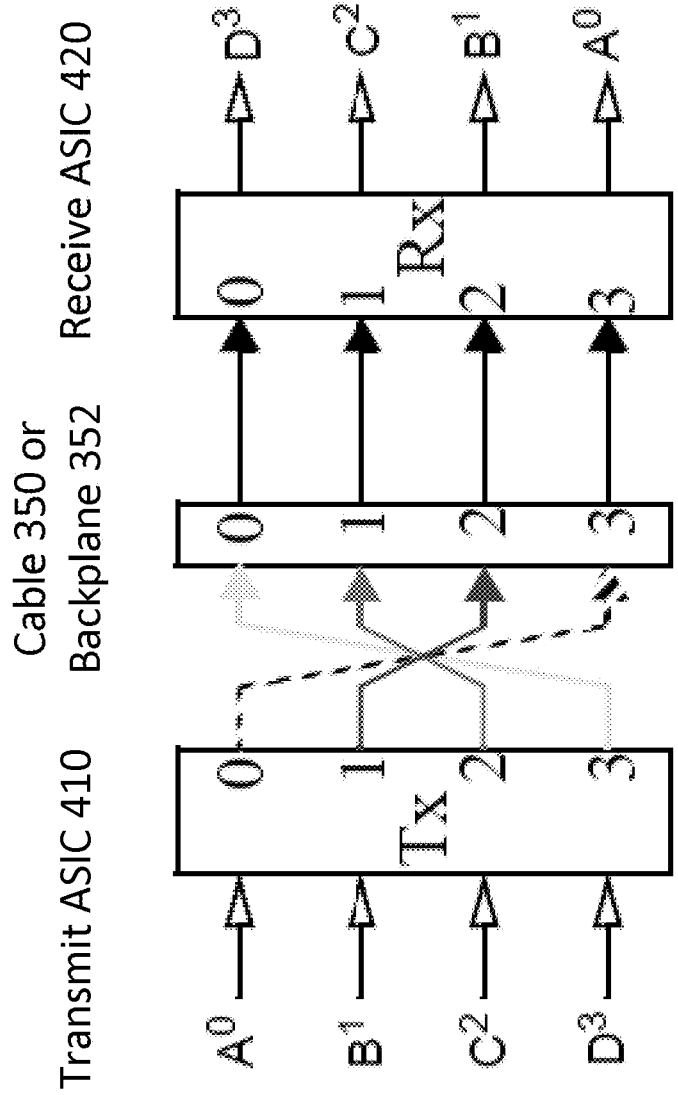
FIGS. 9A-9F depict operation of the lanes of FIG. 8 using lane reversals, in accordance with various embodiments of the invention.

To ease the design of high speed connections between components, and across cables 350 and backplanes 352, lane reversal is allowed. For example, some communications boards have an inability to route signals to their usual pins without crossing the wires, due to various design constraints. In this situation, the physical connectors may remain in their expected locations for physical coupling with a cable 350 or a backplane 352, but the signals are routed in hardware to the pins in the reverse of the usual order. Such a "lane reversal" is fixed by the physical hardware design of the component. Various cables 350 and backplanes 352 may include lane reversal hardware as well. Therefore, it becomes necessary to account for possible lane reversals at the receiving end of each communications link. FIG. 9A shows the same data as FIG. 8 being sent with a lane reversal at the physical connection between the transmitter and the communications link 350, 352. Thus, phit A is transmitted on logical lane 0 and physical lane 0, but this lane is reversed so it is received on physical lane 3 by the receiving ASIC 420. The other phits are similarly reversed.

To compensate for this lane reversal, the receiver includes a lane reversal multiplexer (MUX), which reverses the physical to logical lane mapping after reception, as described in more detail below. This enables the receiver to recover reversed data frames. To permit detection of lane reversals, each physical lane transmits the unique logical lane ID; thus the receiving ASIC 420 can determine that the phit A received on physical lane 3 was actually sent on logical lane 0, as shown.

Figure 9B:
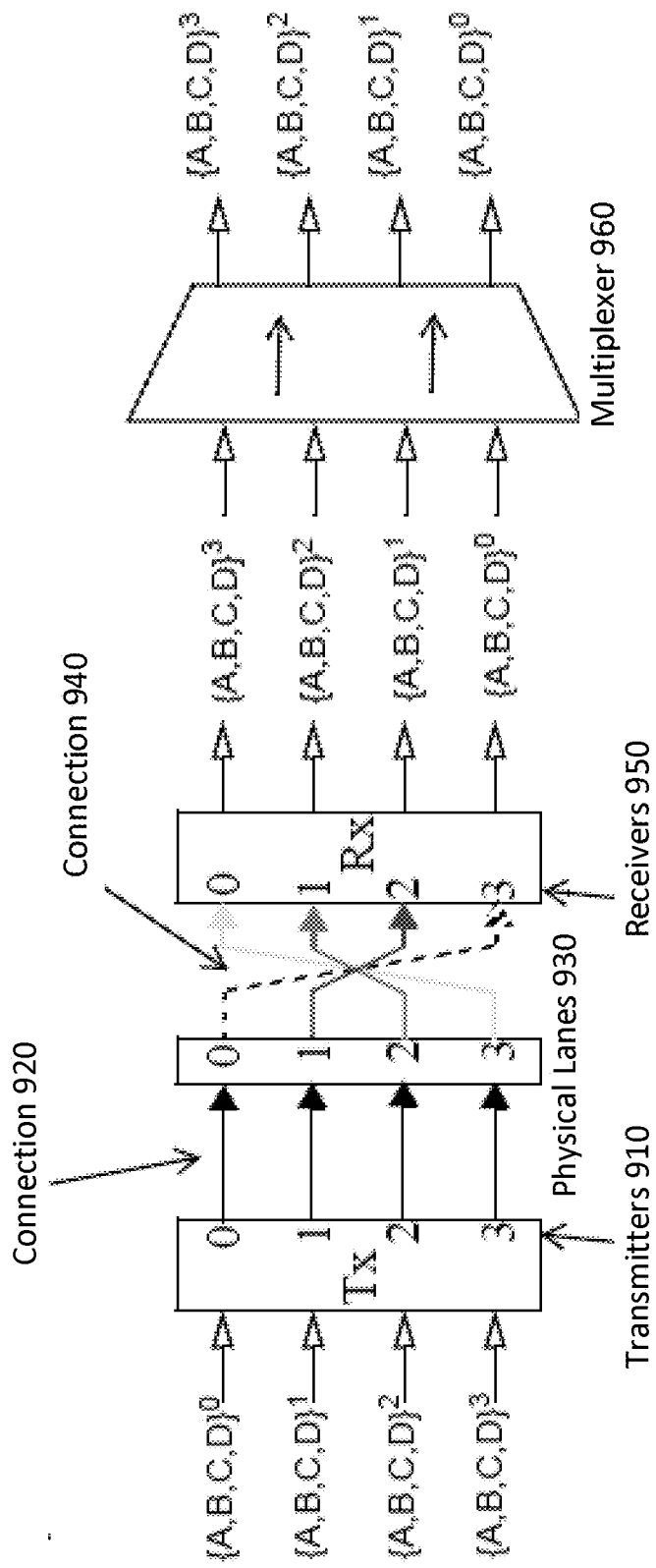

FIG. 9B shows a communications link operating in one lane (quarter bandwidth) fail over mode with an uncorrected lane reversal in the hardware of the receiver. The individual physical components are labeled for clarity. Four transmitters 910 are provided, one for each physical lane. A connection 920, for example a cable 350 or pins on a backplane 352, also has four lanes. These lanes are shown logically as physical lanes 930. There is a similar connection 940 on the receiver side between the physical lanes 930 and the four receivers 950.

As can be seen from FIG. 9B, the lanes of data are received in reverse order at the receiver. Therefore, a multiplexer 960 is used to correct the order of the lanes. The corrected configuration in shown in FIG. 9C, which shows the receiver MUX 960 programmed to (re)reverse the lanes to their original order. Programming of the lane reversal MUX 960 in the receiver is a "set and forget" operation, since lane reversal is determined by the hardware configuration.

Figure 9C:
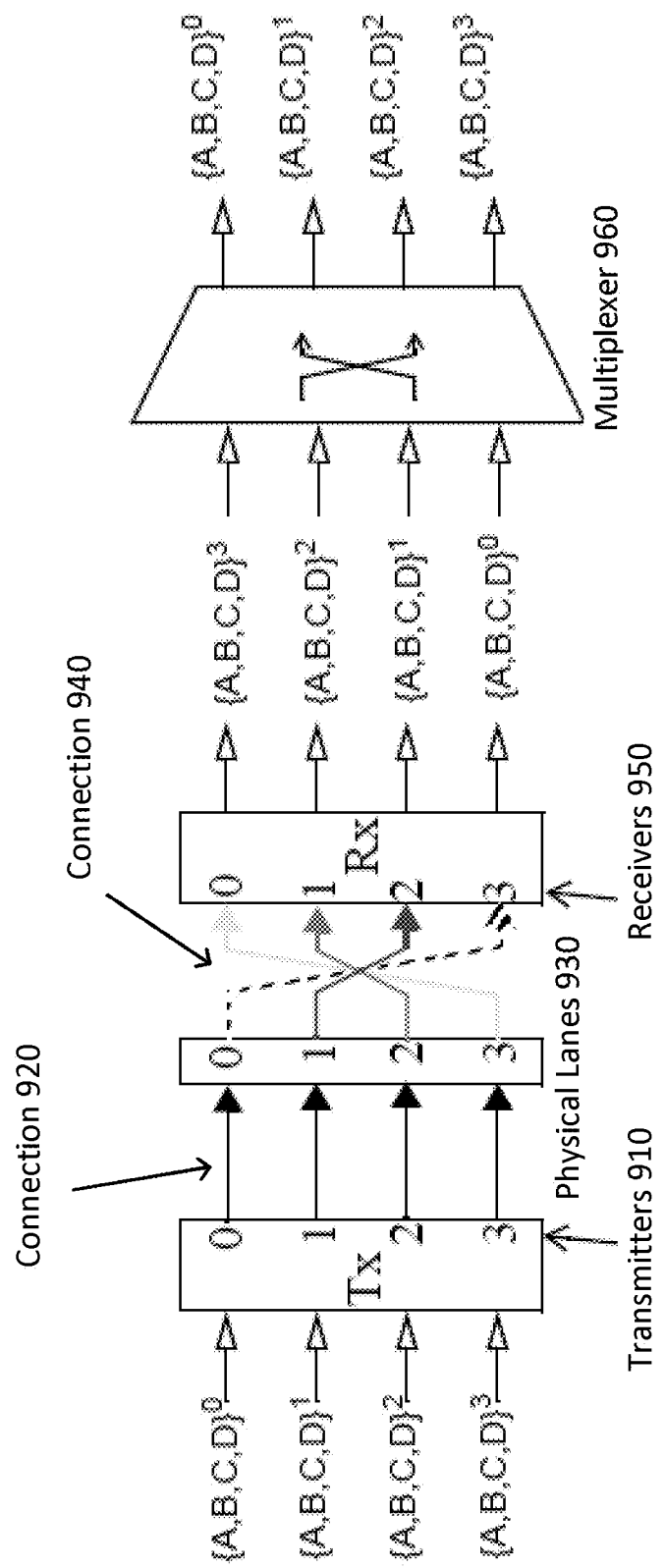

Lane reversal may be used advantageously in conjunction with the fail over protocol described above. Because the link is operating in one lane (quarter bandwidth) fail over mode, each phit A,B,C,D is sequentially transmitted on each lane. Therefore, the receiving ASIC is free to choose the best physical lane from which to receive data. Assume that physical lane 0 (at the receivers 950) is chosen due to its superior signal quality. If the corresponding physical receiver 0 hardware is unusable (for example, to save power), but receiver 3 is usable, the receiving ASIC may still send and receive data on logical lane 0 if it initiates a lane reversal, as shown in FIG. 9C. As noted above, when a one lane fail over state is entered, only one physical and logical transmitter lane are enabled. In the example of FIG. 9C, physical receivers 0, 1, and 2 are disabled in the low power state (leaving physical receiver 3 operating), and physical transmitters 1, 2, and 3 are also disabled in the lower power state (leaving physical transmitter 0 operating).

Figure 9D:
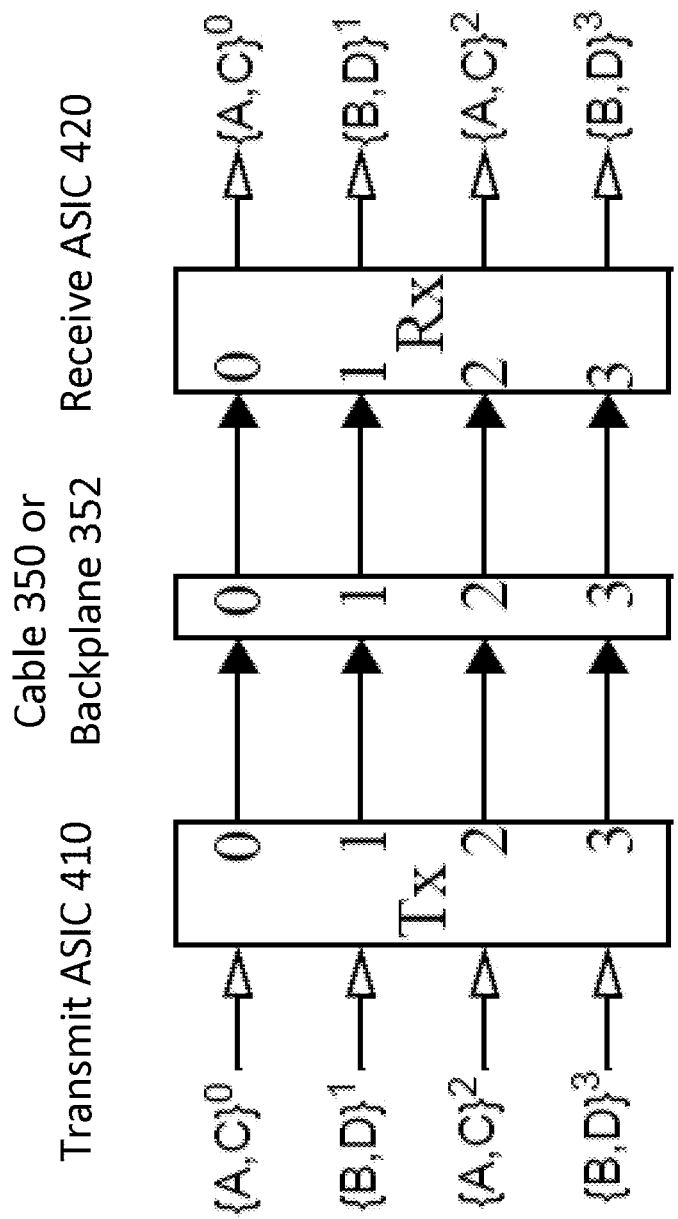
Figure 9E:
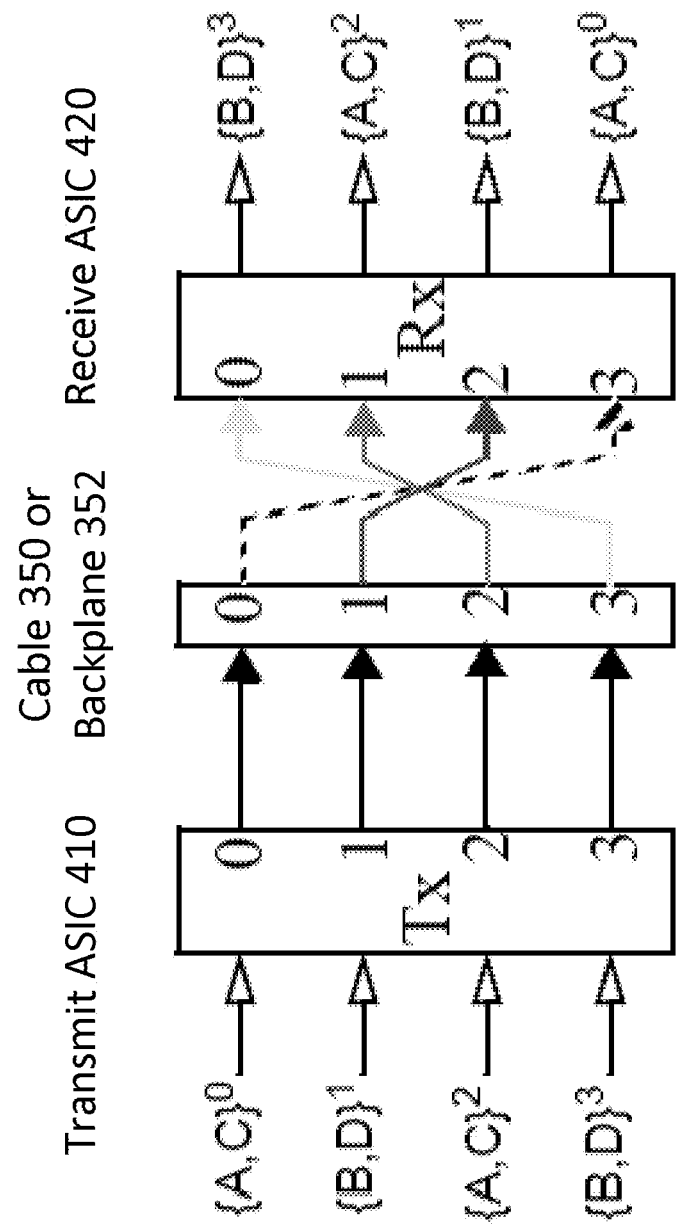
Figure 9F:
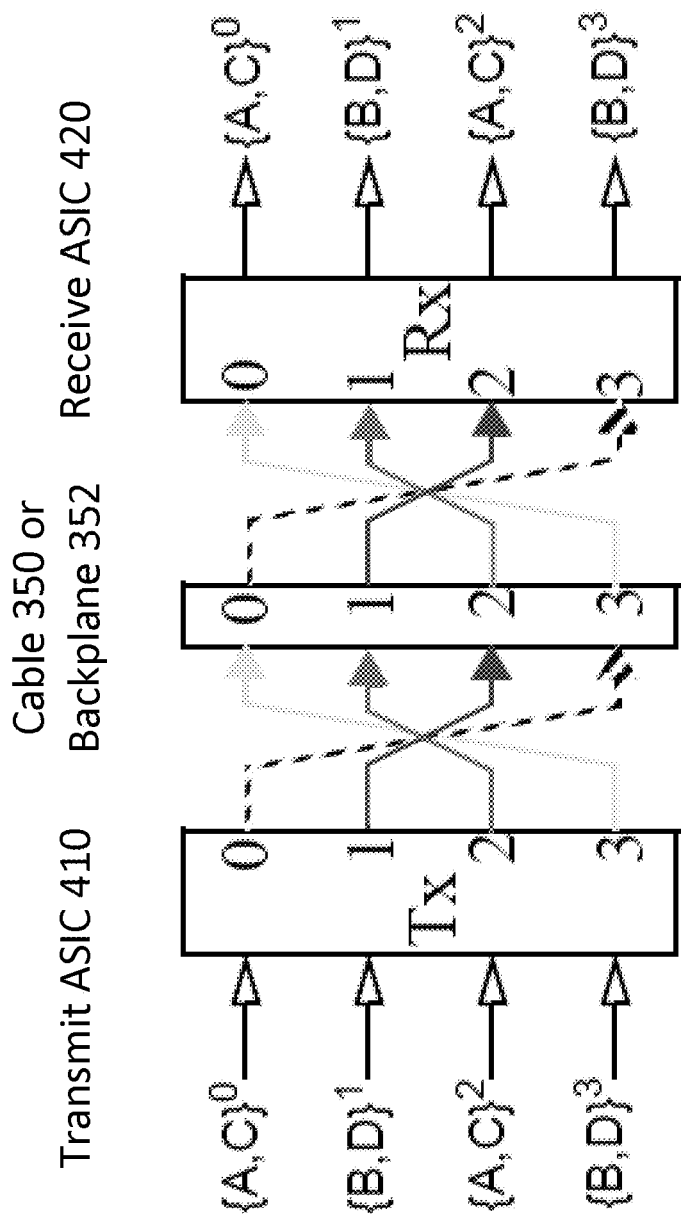

FIG. 9D shows an example of a two lane fail over mode without lane reversal. FIG. 9E shows a two lane fail over mode with lane reversal on the receiver side. FIG. 9F shows a two lane fail over mode with lane reversal on both the transmitter and receiver side. (In these three Figures, the receiver multiplexer 960 is omitted for clarity.) In all of these examples, two of the lanes are powered down, and the receiving ASIC 420 has freedom to choose the lanes on which to receive data. For example, assume in FIG. 9E that physical lanes 2 and 3 have superior signal quality at the receiving ASIC 420. Because the lanes are reversed, physical lane 2 (respectively 3) maps to logical lane 1 (respectively 0). Therefore, logical lanes 0 and 1 are used to send and receive data frames. Transmitting ASIC 410 powers down transmitters and receivers 2 and 3, while receiving ASIC 420 powers down transmitters and receivers 0 and 1.

General Implementation

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A high performance computing system comprising a plurality of computing devices that perform a shared computation by communicating data using an interconnect having a plurality of data lanes, wherein a communication path comprises only the data lanes of the interconnect communicating data between a first computing device in the plurality of computing devices and a second computing device in the plurality of computing devices, each of the first computing device and second computing device comprising:
   one or more computing processors for performing a portion of the shared computation; and
   a micro-controller coupling the one or more computing processors to the plurality of data lanes, wherein the micro-controller is configured to:
   (1) calculate an error metric associated with the receipt of data by the computing device from the coupled computing device using a given data lane of the interconnect, and
   (2) in response to the error metric failing a threshold test, remove the given data lane from service, whereby the interconnect subsequently communicates data between the computing device and the coupled computing device along the communication path using the data lanes that remain in service.

2. A computing system according to claim 1, wherein the communication path uses four data lanes.

3. A computing system according to claim 1, wherein the error metric comprises a signal quality, a link bit error rate, or a score of an eye diagram.

4. A computing system according to claim 1, wherein the micro-controller is further configured to transmit a fail over request to the coupled computing device.

5. A computing system according to claim 4, wherein the micro-controller is further configured to start a timeout process and to either (a) retry the fail over request or (b) cease transmitting data using the given data lane, when the timeout process completes prior to the micro-controller receiving, from the coupled computing device, an acknowledgement of the fail over request.

6. A computing system according to claim 1, wherein the micro-controller is configured to transmit and receive data according to a fail over mode that is selected from a plurality of fail over modes based on which data lanes are in service, each such failure mode being associated with a data format, and further wherein the micro-controller configures the interconnect to communicate data with the coupled computing device using the data format associated with the operating fail over mode.

7. A computing system according to claim 1, further comprising a lane reversal multiplexer.

8. A computing system according to claim 7, wherein the lane reversal multiplexer is configured by the micro-controller as a function of a configuration of the hardware of the interconnect.

9. A computing system according to claim 1, wherein the micro-controller is further configured to remove the given data lane from service by powering down the given data lane.

10. A computing system according to claim 1, wherein the plurality of data lanes comprises a data cable or backplane circuitry.

11. A computing system according to claim 1, wherein the interconnect comprises a NUMAlink Interconnect, a Quick-Path Interconnect (QPI), a successor of either of these interconnects, or a combination of any of the above interconnects.

12. A method of controlling an interconnect having a plurality of data lanes, in a high performance computing system comprising a plurality of computing devices that perform a shared computation by communicating data using the interconnect, wherein a communication path comprises only the data lanes of the interconnect communicating data between a first computing device in the plurality of computing devices and a second computing device in the plurality of computing devices, the method comprising:
   calculating an error metric associated with the receipt of data by the first computing device from the second computing device using a given data lane of the interconnect; and
   in response to the error metric failing a threshold test, removing the given data lane from service, whereby the interconnect subsequently communicates data between the first computing device and the second computing device along the communication path using the data lanes that remain in service.

13. A method according to claim 12, wherein the communication path uses four data lanes.

14. A method according to claim 12, wherein the error metric comprises a signal quality, a link bit error rate, or a score of an eye diagram.

15. A method according to claim 12, further comprising transmitting a fail over request from the first computing device to the second computing device.

16. A method according to claim 15, further comprising:
   starting a timeout process; and
   either (a) retrying the fail over request or (b) ceasing to transmit data using the given data lane, when the timeout process completes prior to receiving, from the second computing device, an acknowledgement of the fail over request.

17. A method according to claim 12, further comprising:
   transmitting and receiving data according to a fail over mode that is selected from a plurality of fail over modes based on which data lanes are in service, each such failure mode being associated with a data format; and
   configuring the interconnect to communicate data with the second computing device using the data format associated with the operating fail over mode.

18. A method according to claim 12, further comprising reversing a physical transmission or reception order of the plurality of lanes using a lane reversal multiplexer.

19. A method according to claim 18, further comprising configuring the lane reversal multiplexer to reverse the order of the plurality of lanes as a function of a configuration of the hardware of the interconnect.

20. A method according to claim 12, wherein removing the given data lane from service comprises powering down the given data lane.

21. A method according to claim 12, wherein the plurality of data lanes comprises a data cable or backplane circuitry.

22. A method according to claim 12, wherein the interconnect comprises a NUMAlink Interconnect, a QuickPath Interconnect (QPI), a successor of either of these interconnects, or a combination of any of the above interconnects.

* * * * *